United States Patent [19]

Zysmaan

[11] Patent Number: 5,216,879
[45] Date of Patent: Jun. 8, 1993

[54] PROPULSION SYSTEM ASSEMBLY

[75] Inventor: Steven H. Zysmaan, Middletown, Conn.

[73] Assignee: United Technologies Corporation, Hartford, Conn.

[21] Appl. No.: 752,735

[22] Filed: Aug. 30, 1991

[51] Int. Cl.⁵ .............................................. F02K 1/36
[52] U.S. Cl. ......................................... 60/262; 60/264; 244/54
[58] Field of Search ..................... 60/262, 264, 39.31; 244/53 R, 54

[56] References Cited

U.S. PATENT DOCUMENTS

| 3,084,507 | 4/1963 | Kleinhans et al. | 60/264 |
| 3,346,193 | 10/1967 | Tumicki | 60/262 |
| 3,579,993 | 5/1971 | Tanner | 60/262 |
| 3,696,617 | 10/1972 | Ellis | 60/262 |
| 4,238,092 | 8/1978 | Brennan | 244/54 |

Primary Examiner—Louis J. Casaregola
Attorney, Agent, or Firm—Gene D. Fleischhauer

[57] ABSTRACT

A propulsion system assembly for a vehicle such as an aircraft having a nacelle and shroud is disclosed. Various construction details are developed which permit the flow of cooling air into the full circumference of the shroud despite the blockage of the shroud by upstream structure such as a pylon on an aircraft engine. In one embodiment, the nozzle is disposed downstream of an engine in the nacelle and inwardly of the shroud. A passage 44 extends rearwardly in the pylon and underneath the shroud to duct cooling air into regions of the shroud blocked by the upstream structure.

5 Claims, 2 Drawing Sheets

PROPULSION SYSTEM ASSEMBLY

TECHNICAL FIELD

This invention relates to a propulsion system assembly having a nacelle and shroud for the nacelle. More particularly, it relates to structure for guiding the flow of air into an opening between the shroud and the nacelle.

BACKGROUND OF THE ART

Powerplants for vehicles, such as the propulsion system for an aircraft, use a propulsion system assembly which includes an engine disposed in a pod or nacelle. The engine has a flow path for working medium gases which extends through the engine and from the exit of the engine. As these hot, high velocity gases exit the engine and enter the atmosphere, the gases may cause unacceptable levels of noise in the exhaust.

The amount of noise generated by the working medium gases as they pass through the atmosphere is proportional to their velocity. Accordingly, many designs exist for mixing cool, relatively low velocity gases from the exterior of the engine with the hot, high velocity gases to decrease the level of noise. One example of such a design is shown in Department of Transportation (FAA) Publication entitled "727 Noise Retrofit Feasibility, Volume 2" by Anderson et al of the Boeing Company, dated November 1972. This final report shows in FIG. 2-8 the use of an ejector shroud in combination with a lobe assembly to mix gases from the exterior with gases from the interior.

U.S. Pat. No. 3,696,617 issued to Ellis is another example of a sound suppression device employing the mixing of cool exterior gases with hot working medium gases from the interior. In this embodiment, the ejector is spaced axially from the nacelle leaving an opening therebetween. A pylon 12 for supporting the engine nacelle and shroud extends longitudinally above the engine nozzle and shroud and partially blocks the flow of cool exterior gases into the ejector.

The above art notwithstanding, scientists and engineers working under the direction of Applicants' Assignee are still seeking to improve propulsion system assemblies to decrease levels of noise associated with the exhaust stream.

Disclosure of Invention

According to the present invention, a propulsion system assembly having an annular opening between a nacelle and shroud which is blocked by upstream structure includes at least one diverging undercut passage in the structure between the shroud and nacelle to direct air into the shroud.

In accordance with one embodiment of the present invention, the assembly has a passage on each side of the pylon, each passage being bounded longitudinally by one of two converging axial walls on the pylon, being bounded radially inwardly by the nacelle and being bounded radially outwardly by circumferentially and axially extending surfaces on the pylon.

In one particular embodiment, the propulsion system assembly includes a nozzle having a circumferential surface interrupted by inwardly extending lobes for mixing air on the interior of the nacelle with air from the exterior of the nacelle, and the walls of the pylon taper to a trailing edge region at a location on a circumferentially level portion of the nozzle surface between the upstream end and downstream end of the nozzle.

A primary feature of the present invention is a propulsion system assembly having an opening between a nacelle and shroud. An axially extending structure, such as a pylon, blocks the opening to the shroud and has at least one diverging passage disposed between the shroud and the nacelle. In one detailed embodiment, a passage extends longitudinally on either side of the pylon. Each passage is bounded by one of two converging axial walls on the pylon. A nozzle disposed on the interior of the shroud has a circumferentially extending surface interrupted by inwardly extending lobes. The axially converging walls on the pylon are joined together at a trailing edge at a location on a circumferentially level portion of the circumferentially extending surface on the nozzle.

A principal advantage of the present invention is the level of noise suppression which results from air entering the full circumference of the shroud under operative conditions by reason of the passage ducting exterior air into a location which would otherwise be blocked by structure, such as the pylon. Another advantage of the present invention is the engine efficiency and reduced vibration which results from the relatively smooth aerodynamic termination of the axial walls, reducing turbulence compared to structures having a partial blockage of flow or a pylon which abruptly terminates in this region. Still another advantage is the aerodynamic efficiency and full circumferential mixing under static and cruise conditions of the engine which results from the rounded contour on the side of the pylon at the top of the passage and on the shroud which allow the flow to enter at different circumferential and axial angles.

The foregoing features and advantages of the present invention will become more apparent in light of the following detailed description of the best mode of carrying out the invention and in the accompanying drawings.

BEST MODE FOR CARRYING OUT THE INVENTION

Figure 1:
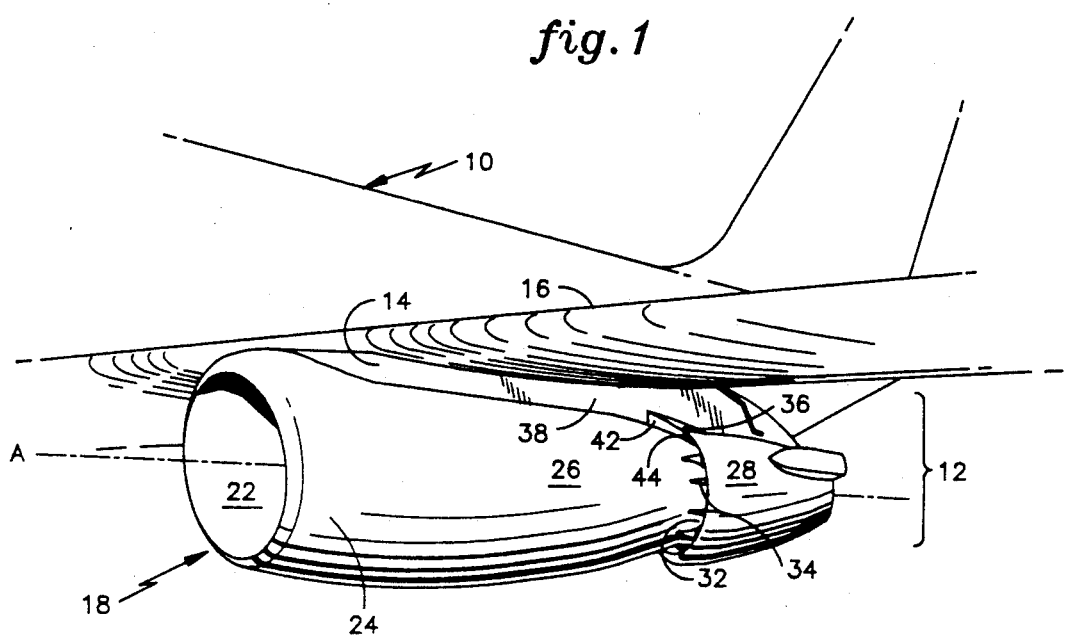
FIG. 1 is a partial perspective view of an aircraft having a propulsion system assembly attached to a wing, the assembly including a pylon, a nacelle and a shroud extending axially rearward of the nacelle.

FIG. 1 is a partial perspective view of one embodiment of the present invention showing an aircraft 10 having a propulsion system assembly 12. The assembly has an axis A. The propulsion system assembly includes a pylon 14 attached to the wing 16. An axial flow gas turbine engine (not shown) is supported from the pylon. A nacelle 18 is supported from the pylon and engine. The nacelle has an interior 22 and an exterior 24 having an exterior surface 26. The interior adapts the nacelle to receive the engine.

A shroud, such as the ejector shroud 28, is disposed axially rearwardly from the nacelle 18 leaving an opening 32 therebetween which extends circumferentially. The opening is blocked by the pylon 14 and interrupted by a plurality of aerodynamic support struts 34 which extend from the engine through the nacelle to the shroud.

The pylon includes a pair of circumferentially and axially extending surfaces, as represented by the surface 36 which undercut each side 38 of the pylon. A pair of axially extending walls, as represented by the axially extending wall 42, converges toward the axis A of the engine in the rearward direction. Each wall 42 extends in a generally radial direction from the surface on the pylon to the exterior surface 26 on the nacelle. The wall 42 provides, in cooperation with the surfaces 26, 36, a diverging passage 44 which extends under the shroud.

Figure 2:
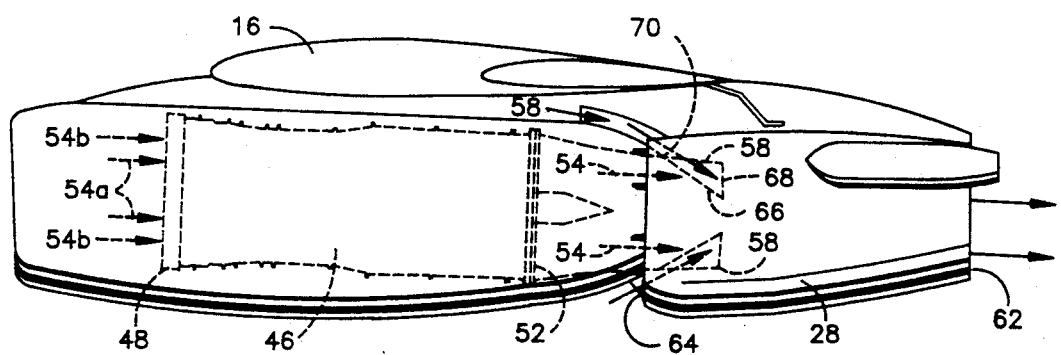
FIG. 2 is side elevation view of the propulsion system assembly shown in FIG. 1 showing the relationship of a gas turbine engine disposed in the interior of a nacelle to a nozzle disposed on the interior of the shroud.

FIG. 2 is a side elevation view of the propulsion system assembly 12 shown in FIG. 1 showing the relationship of the gas turbine engine 46 disposed on the interior 22 of the nacelle 18 to the adjacent structure. The engine has an inlet 48 and an exit 52. At least one first flow path 54 for working medium gases extends through the engine. In the embodiment shown, the gas turbine engine is a turbofan gas turbine engine having a first bypass flow path 54b and a first core engine flow path 54a for working medium gases. These first engine flow paths join to form the first flow path prior to exit of the first flow path from the engine. The first flow path extends axially for at least a portion of the engine and rearwardly from the engine beyond the exit. In equivalent embodiments, these flow paths may combine downstream of the engine.

A second flow path 58 for cooling air extends over the exterior surface 26 of the nacelle. The shroud 28 has a downstream end 62 and a curved, aerodynamic upstream end 64 for receiving this flow path. A nozzle 66 is disposed inwardly of the shroud. The nozzle has a downstream end 68 and an upstream end 70 which is downstream of the exit 52 of the engine 46. The nozzle receives gases from the first flow path 54 and from the second flow path 58 and mixes them together on the interior of the ejector shroud 28. The gases are flowed through the ejector shroud and exhaust from the propulsion system assembly at the exit 64 of the shroud.

Figure 3:
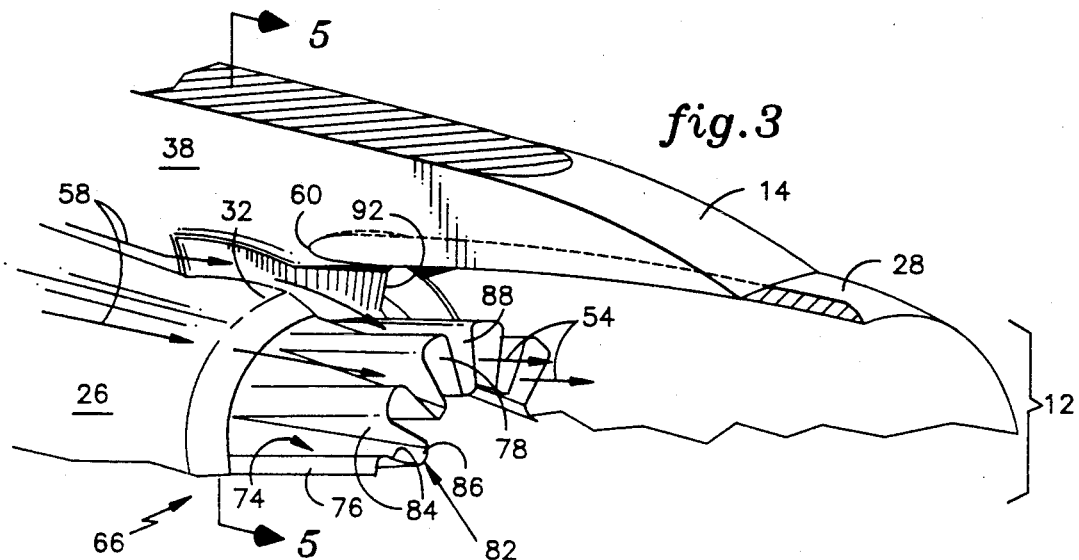
FIG. 3 is a partial perspective view of the propulsion system assembly shown in FIGS. 1 and 2 with a portion of the assembly broken away to show the relationship of the pylon, nacelle, shroud and nozzle.

FIG. 3 is a partial prospective view of the propulsion system assembly 12 shown in FIGS. 1 and 2. The pylon 14 of the assembly 12 is broken away to show the relationship of the pylon, nacelle 18, shroud 28 and nozzle 66 to each other at the cruise operative condition of the engine. At the cruise operative condition of the engine, the second flow path 58 extends axially along the exterior 26 of the nacelle and axially into the opening 32 between the shroud and the nacelle. The leading edge 60 of the shroud is rounded for aerodynamic reasons.

The nozzle 66 has an exterior surface 74 which extends circumferentially about the interior of the shroud 28. The surface includes a plurality of circumferentially level sections 76. That is, in the circumferential direction there is no abrupt, significant change in nozzle height as measured from the axis A. Each circumferentially level section has a first nozzle passage, as represented by the first nozzle passage 78, for the first flow path 54. The first flow path extends axially through the nozzle and inwardly of the associated circumferentially level portions. A plurality of lobe sections 82 extend inwardly between each pair of associated circumferentially level sections. Each lobe section has a pair of radially oriented first walls 84 extending inwardly from the circumferentially level sections. The first walls have a circumferentially extending bottom portion 86 which are integral with each other to complete the lobe. In the embodiment shown, the nozzle is a one-piece construction or may be constructed to act as one-piece. The bottom portion faces axially and is inclined at an angle to the flow path. Each lobe section provides a second nozzle passage, as represented by the second nozzle passages 88, which are each in flow communication with a portion of the second flow path 58.

Figure 4:
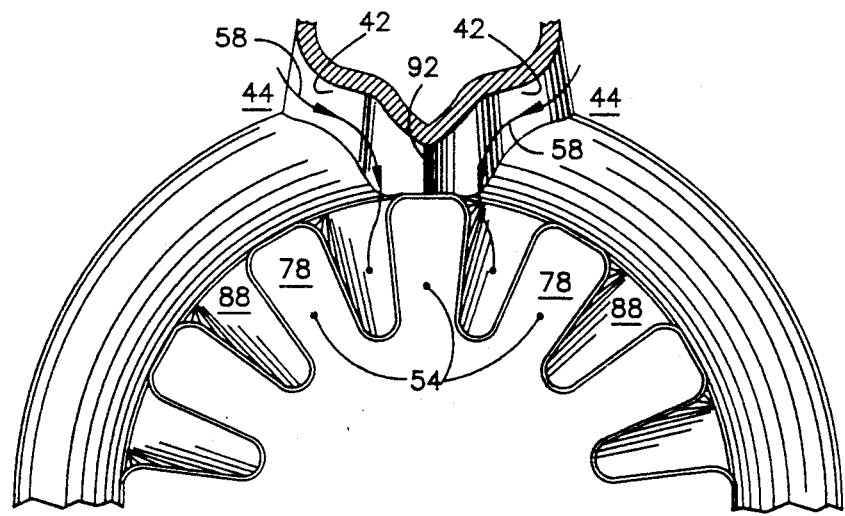
FIG. 4 is an end view of the assembly shown in FIG. 1 with portions of the assembly broken away for clarity.

The pylon 14 extends between the shroud 28 and nacelle 18 and, upstream of the shroud, blocks the opening 32. As shown in FIG. 4, the pylon has a pair of walls 42 which are spaced circumferentially, one of which was shown in FIG. 1. The walls extend radially between the circumferentially extending surfaces 36 of the pylon and the exterior surface 26, 74 of the nacelle and the nozzle. The walls terminate at a trailing edge 92, forming an aerodynamically smooth structure. The walls 42 face in opposite circumferential directions leaving an open area 94 therebetween. The open area permits the passage of support structure to support the engine, the nacelle or the nozzle. In the embodiment shown, the support structure does not extend into the open area.

The walls 42 extend axially, extend radially inwardly from the surface 36, and converge axially toward each other. As shown in FIG. 3 and 4, the trailing edge 92 is disposed at a location which is on the circumferentially level surface 76 of the nozzle 66 and is between the upstream end 70 and the downstream end 68 of the nozzle. The axially extending wall 42 in combination with the circumferentially extending surfaces 26, 36 forms pairs of diverging passages 44 on either side 38 of the pylon. These passages extend under the shroud 28 to provide cooling air to the full circumference of the downstream end 68 of the nozzle.

Figure 5:
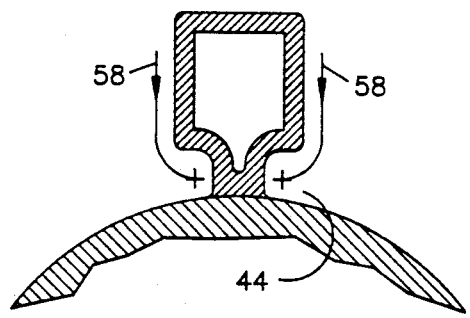
FIG. 5 is a view taken along the lines 5—5 of FIG. 3.

FIG. 5 is a view generally taken along the lines 5—5 of FIG. 3 showing the relationship of the second flow path 58 to the nacelle 18 and pylon 14 during operative conditions at low speed, such as at static or taxi speeds. The second flow path for working medium gases extends down the side 38 of the pylon entering the passages 44 and proceeding axially rearwardly and inwardly to the nozzle 66. As can be seen in FIG. 5, the juncture of the walls and surfaces of the shroud and pylon are rounded to avoid separation as was the shroud leading edge 60.

During operation of the propulsion system assembly 12 shown in FIG. 1 and FIG. 2, working medium gases are flowed along the first flow path 54 through the gas turbine engine 46 on the interior of the nacelle 18. As the gases pass through the engine, energy is added to the gases increasing their pressure, temperature and velocity. As the hot, high velocity gases are expanded through the nozzle, the nozzle 66 and shroud 28 act as an ejector. Cooling air is pulled along the second flow path 58 on the exterior of the nacelle 26, primarily downward and around the rounded corner or juncture 96 of the pylon and shroud at low speed conditions into the opening 32 (FIG. 5) or straight into the opening 32 (FIG. 2) during high speed conditions of the aircraft.

Once the gases flow into the pylon passages 44, the gases flow axially rearwardly in the passages. As the gases move rearwardly in the passage, the gases become turbulent. Because of the gently diverging channel formed by the converging taper of the walls, the turbulent flow does not separate from the walls 42 and flow is ducted to the full circumference of the nozzle 66 downstream of the trailing edge 92. This provides cool gases from the second flow path 58 around the entire circumference of the nozzle and through the passages 88 as the cool gases flow down from the walls 42. These cool gases mix with the hot gases flowed along the first flow path 54 which passes through the first nozzle passages 78 in the nozzle.

As the cool gases from the second stream 58 mix with the hot gases 54 from the first stream, the velocity and temperature of the gases is reduced with a reduction in noise associated with the aircraft. A particular advantage of the present invention is the ability of air to enter the full circumference of the shroud under operative conditions whether the speed is low (such as static or taxi speed) as shown in FIG. 5 or at high speeds as shown in FIGS. 2 and 3. This occurs because the passages 42 direct air into a location which would otherwise be blocked by the pylon and provides a level of noise suppression which is greater than those constructions in which the pylon is terminated abruptly upstream of the nozzle or in which the pylon blocks the nozzle at this location. The relatively smooth aerodynamic termination of the axial walls, the location of termination of the walls at trailing edge 92 and the existence of the axial walls themselves reduces vibrations and turbulence in the flow at this location. The reduction of turbulence is promoted by the rounded contour on the side of the pylon at the top of the passage and on the shroud which allows the flow to enter at different angles both circumferentially and axially whether at high speed or low speed operative conditions.

Although the invention has been shown and described with respect to detailed embodiments thereof, it should be understood by those skilled in the art that various changes in form and detail thereof may be made without departing from the spirit and scope of the claimed invention.

I claim:

1. A propulsion system assembly for a vehicle having an engine and a nacelle disposed about the engine which has an exterior, which comprises:
   a shroud disposed circumferentially about the nacelle which is spaced radially from the nacelle leaving an opening therebetween for cooling air from the exterior of the nacelle;
   structure which extends radially upstream of the opening to block flow from entering the opening, the structure extending between the shroud and nacelle and having at least one undercut portion forming a passage which diverges in the axial direction and which begins upstream of the opening and is bounded by an axially extending wall on the structure; wherein the passage provides a flow path to duct air from the exterior of the nacelle to a location downstream of the blocked portion of the opening on the interior of the shroud.

2. The propulsion system assembly of claim 1, wherein a nozzle is disposed in the interior of the shroud, the nozzle having a first flow path in flow communication with the engine and a second flow path in flow communication with the exterior of the nacelle and wherein the passage ducts flow along the second flow path to a region of the nozzle which would otherwise receive lesser flow due to the blockage of the opening.

3. The propulsion system assembly of claim 2, wherein the nozzle has a surface extending circumferentially about the nozzle, the surface having a plurality of circumferentially level sections spaced apart each having a first nozzle flow path inwardly of the level section in flow communication with the first flow path and a plurality of lobes, each lobe extending between the adjacent level sections and inclined inwardly to form a second nozzle flow path in flow communication with the second flow path, and wherein the structure blocking the opening has two undercut portions, one on each side of the structure to form a pair of diverging passages bounded by a pair of circumferentially spaced walls which converge circumferentially to a trailing edge which is axially aligned with the nozzle and circumferentially aligned with a level section of the nozzle.

4. The propulsion system assembly of claim 3, wherein the vehicle is an aircraft, wherein the propulsion system has a pylon having sides and a circumferentially and axially extending surface which extends from each side of the pylon to the associated wall bounding the passage to form the top of the under cut portion, and the juncture between the surface and the side of the pylon is curved to decrease the possibility of separation under operative conditions.

5. A propulsion system assembly for an aircraft having a nacelle, which comprises:
   a. a pylon extending from the aircraft to support the powerplant assembly;
   b. a gas turbine engine which is adapted to be disposed in the interior of a nacelle, the engine having an inlet, an exit and at least one first flow path for working medium gases which extends through the engine, the flow path extending axially for at least a portion of the engine and rearwardly from the engine beyond the exit;
   c. a nacelle having an exterior and an interior, the nacelle having an exterior surface extending circumferentially about the engine, the engine being disposed in the interior of the nacelle, the nacelle having a second flow path for cooling air which extends over the exterior surface of the nacelle;
   d. a shroud which extends circumferentially about the first flow path for working medium gases, the shroud having a downstream end downstream of the engine and an upstream end spaced radially from the nacelle leaving an opening for cooling air therebetween which is in flow communication with the second flow path;
   e. a nozzle which has a surface extending circumferentially about the interior of the nozzle, the surface including
      a plurality of circumferentially level sections which extend axially, each circumferentially level section having an inner passage for the first flow path inwardly of the section which extends axially through the nozzle, and
      a plurality of lobe sections, each lobe section extending between an associated pair of the circumferentially level sections and radially inwardly, each lobe section facing outwardly and having a passage in flow communication with a portion of the second flow path, and each lobe section having a pair of radially oriented walls extending inwardly from the circumferentially level sections, the walls being continuous with each other in the circumferential direction such that the walls are inclined inwardly in the downstream direction at an angle to the first flow path; wherein the pylon extends between the shroud and the nacelle and blocks the opening between the shroud and the nacelle, the pylon having a pair of circumferentially and longitudinally extending surfaces, a pair of walls spaced circumferentially and facing in opposite circumferential directions leaving an area therebetween, the walls extending radially between circumferentially extending surfaces of the pylon, and the circumferentially extending surface of the nacelle and the level section of the nozzle, the walls extending axially and converging toward each other to a trailing edge on a circumferentially level section of the nozzle between the upstream end and the downstream end of the nozzle to form a pair of diverging undercut passages which extend under the shroud to provide cooling air to the full circumference of the downstream end of the nozzle.

* * * * *